United States Patent [19]

van Slageren

[11] 4,166,283

[45] Aug. 28, 1979

[54] SELF-THREADING HELICAL SCAN VIDEO CASSETTE RECORDER

[75] Inventor: Nanno van Slageren, Eindhoven, Netherlands

[73] Assignee: U.S. Philips Corporation, New York, N.Y.

[21] Appl. No.: 885,792

[22] Filed: Mar. 13, 1978

[30] Foreign Application Priority Data

Mar. 17, 1977 [NL] Netherlands .......................... 7702875

[51] Int. Cl.² .......................... G11B 15/66; G11B 5/52
[52] U.S. Cl. .......................... 360/95; 360/85; 360/71
[58] Field of Search .................... 360/95, 85, 130, 132, 360/71, 74; 242/197–200

[56] References Cited

U.S. PATENT DOCUMENTS

| Re. 28,215 | 10/1974 | Eibensteiner | 360/95 |
|---|---|---|---|
| 3,792,491 | 2/1974 | Inaga | 360/95 |
| 3,800,314 | 3/1974 | Sato | 360/95 |
| 3,821,799 | 6/1974 | Sumiyoshi | 360/95 |
| 3,825,944 | 7/1974 | Terao et al. | 360/95 |
| 3,939,491 | 2/1976 | Shigeta | 360/85 |
| 3,969,766 | 7/1976 | Tanaka | 360/85 |

*Primary Examiner*—Alfred H. Eddleman
*Attorney, Agent, or Firm*—David R. Treacy

[57] ABSTRACT

A video cassette recording and/or playback apparatus, having a tape guide drum around which the tape is passed in a helical path, and a tape guide device for self threading, mounted on a rotatable support about the drum. The tape drive spindle or capstan is mounted on the rotatable support, and functions as the self-threading guide.

6 Claims, 4 Drawing Figures

SELF-THREADING HELICAL SCAN VIDEO CASSETTE RECORDER

BACKGROUND OF THE INVENTION

1. Field of the Invention

The invention relates to apparatus for recording and/or playing back magnetic recordings of high frequency, in particular video signals, on a recording tape accommodated in a cassette, which apparatus is provided with a tape guide drum along which the tape is passed in a helical path (hereinafter referred to as a helical scan cassette recorder); and more particularly to a helical scan cassette recorder having a self-threading device, which includes a support rotatable about a spindle and at least one tape guide element mounted on the support. Upon insertion of a cassette into the apparatus the guide element projects through an opening of the cassette behind the tape which extends near this opening. When the support is rotated, the tape is positioned around the drum by the guide element. Such apparatus also has a motor-driven capstan which functions as a tape drive spindle, projecting through the cassette or located near the drum.

2. Description of the Prior Art

An apparatus of this type is known from Netherlands Patent Specification No. 142,004 to which U.S. Re-issue patent No. RE 28,215 corresponds. In this known apparatus the capstan and its drive motor are at a fixed location. After the tape has been wound around the drum by rotation of the support, a movable pressure roller is biased toward the capstan, the tape being gripped between the capstan and pressure roller. This provides reliable tape driving at normal speeds. However, because the tape spools are mounted coaxially, rapid winding can most effectively be carried out only over the drum; this winding mode is a relatively complicated function.

To provide the advantages of easy high speed winding, and less wear while operating in that mode, another known apparatus having cassette reels coplanar rather than coaxial is disclosed in U.S. Pat. No. 3,969,766. This advantage is obtained at the expense, however, of a substantially more complex tape threading device.

A drawback of the known helical scan cassette recorders is that the course of the tape in the apparatus—whose accuracy influences the recording/playback quality and the interchangeability of cassettes and equipment—depends on components which are movable relative to the frame, such as the tape guide pin(s) which are disposed on the rotatable support, and on components which are disposed at a fixed location in the frame, such as the capstan. Designs of this type require very tight manufacturing tolerances, so they have high manufacturing costs.

SUMMARY OF THE INVENTION

An object of the invention is to provide a tape threading device which has a minimized tolerance build-up between the capstan and the tape drum, so that the high cost of extremely tight manufacturing tolerances can be avoided.

Another object of the invention is to reduce the length of tape and number of tape bends between the capstan and the drum so as to minimize variations in tape tension and stretch.

To achieve these objects, in an apparatus according to the invention the tape capstan is mounted on the rotatable threading support, within or on which the tape drum is mounted. In the preferred embodiment the capstan is so arranged that, in the operating position, the tape is wrapped approximately 180° around the capstan. As a result, the pressure roller may be omitted, as well as the extreme position guide pin.

This inventive apparatus has the advantage that those elements which principally determine the course of the tape are all located on the rotatable support, and the location of these elements relative to each other can precisely be referred to one component—the support—, so that an accurate reproducible tape course is guaranteed.

In a further preferred embodiment of the invention, in which the tape guide device has two tape guide pins to provide for 180° angle of drum contact, these pins when a cassette is inserted into the apparatus being both positioned behind the tape such that, upon rotation of the support, one pin pulls the tape from the cassette and the other pin keeps the tape away from the drum as it passes from the cassette towards the one pin, the capstan is the pin which extracts the tape from the cassette.

In recorders of this general type the magnetic heads commonly used for non-helical scanning, such as an erase head and an audio recording/playback head, may also influence the tape course. In yet another preferred embodiment in accordance with the invention, these other heads are also arranged on the rotatable support.

An embodiment of the invention is described in more detail hereinafter with reference to the drawing.

DESCRIPTION OF THE PREFERRED EMBODIMENT

Figure 1:
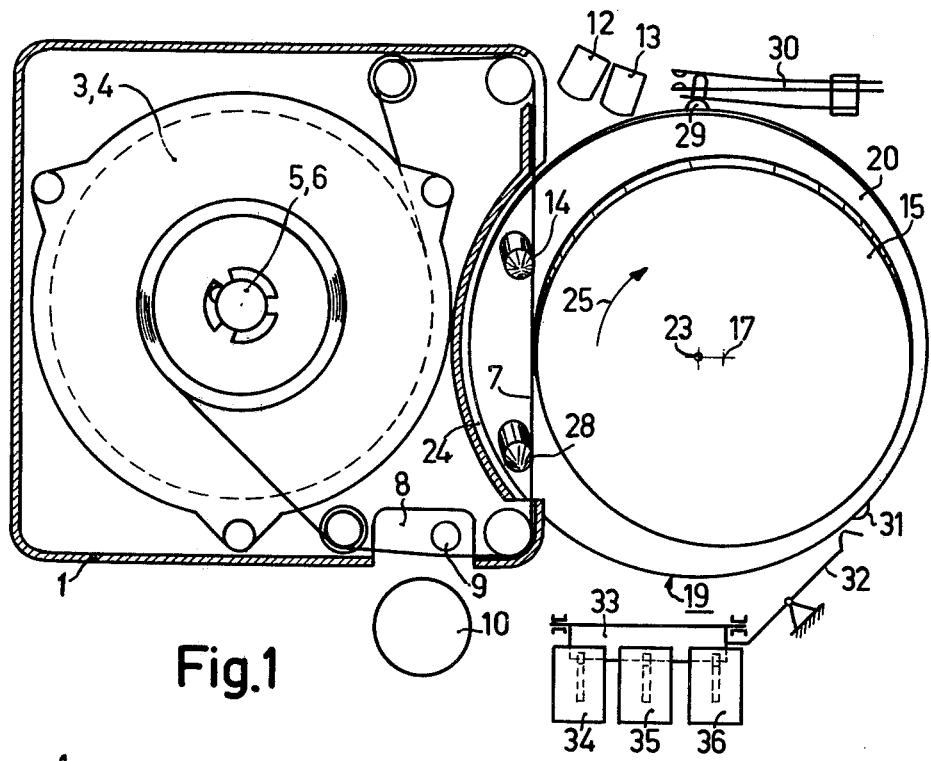
FIGS. 1 and 2 are simplified plan views, partly in section, of a prior known apparatus in the rest position and in the operating position respectively.
Figure 2:
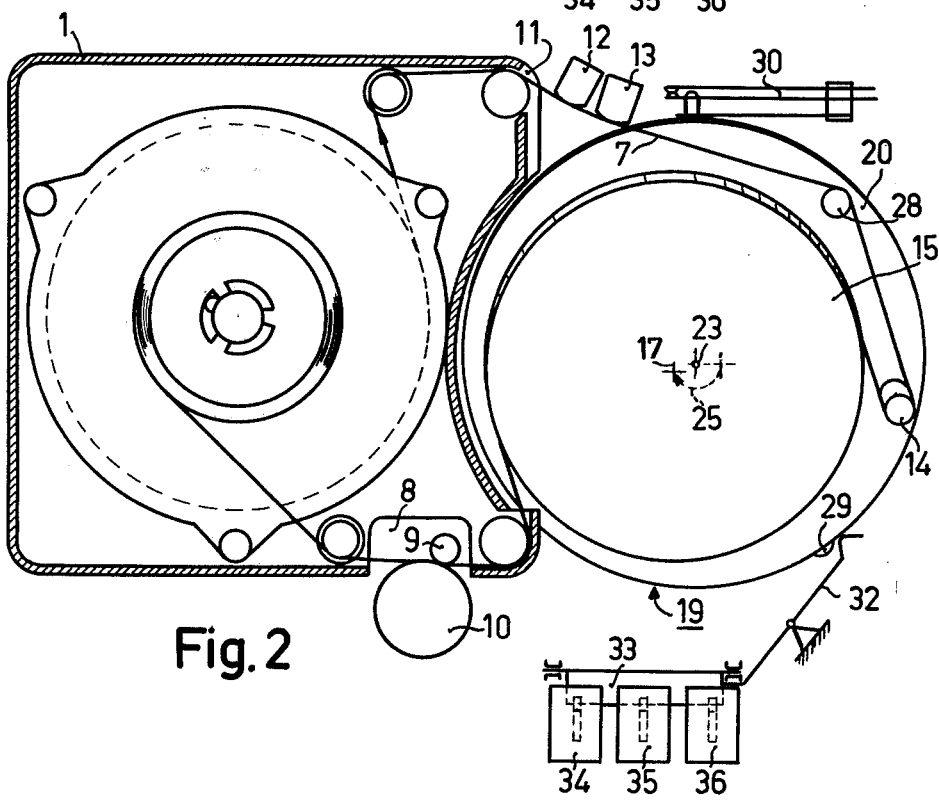

In FIGS. 1 and 2 a cassette 1, inserted in an apparatus as described in U.S. Pat. No. Re 28,215 has reels 3, 4 coaxially arranged above each other and coupled with winding spindles 5, 6 in the apparatus. A tape 7 is driven by a capstan 9 which engages behind the tape in a cassette opening 8, and located to engage with a movable pressure roller 10.

In the operating position shown in FIG. 2 the pressure roller and drive spindle cooperate with each other to control tape speed. The tape leaves the cassette at the side 11 at the same level as the lower reel 4, then passes two magnetic heads 12, 13 and two tape guide pins 28 and 14 in that order. After passing 180° around pin 14, the tape passes approximately 180° around a drum 15 in a helical path, and then re-enters the cassette at a side 11 at the same level as the second reel 3, parallel to the tape portion leaving the cassette. To bring the tape 7 from the position shown in FIG. 1 into the position of FIG. 2, a tape guide device 19 includes a support 20 which carries the tape-guide pins 14, 28 and is rotatable about a spindle 23 extending parallel to and spaced from the drum axis 17. The support 20 and the drum 15 constitute a common unit on which the drum 15 is eccentrically positioned, the unit being pivotable about the spindle 23 of the support. The support 20 moves from the rest position, in which the pins 14, 28 pass through a cassette opening 24 behind the tape 7, in the direction of arrow 25 to the operating position.

Other functions and aspects of this known apparatus are more fully described in the aforementioned U.S. Pat. No. Re 28,215, whose disclosure is expressly incorporated herein by reference.

Figure 3:
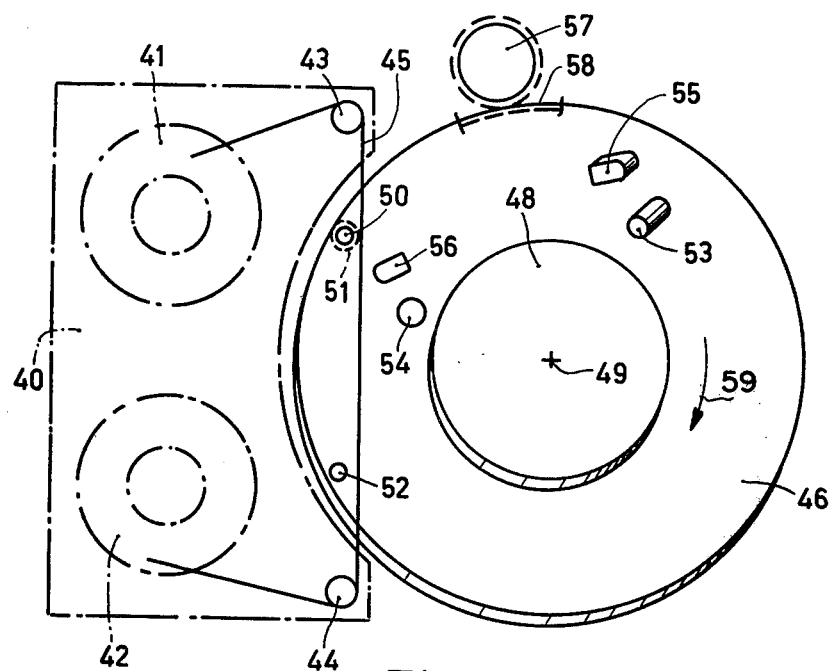
FIGS. 3 and 4 are simplified plan views of a helical scan cassette recorder in accordance with the invention, also in the rest position and the operating position respectively.
Figure 4:
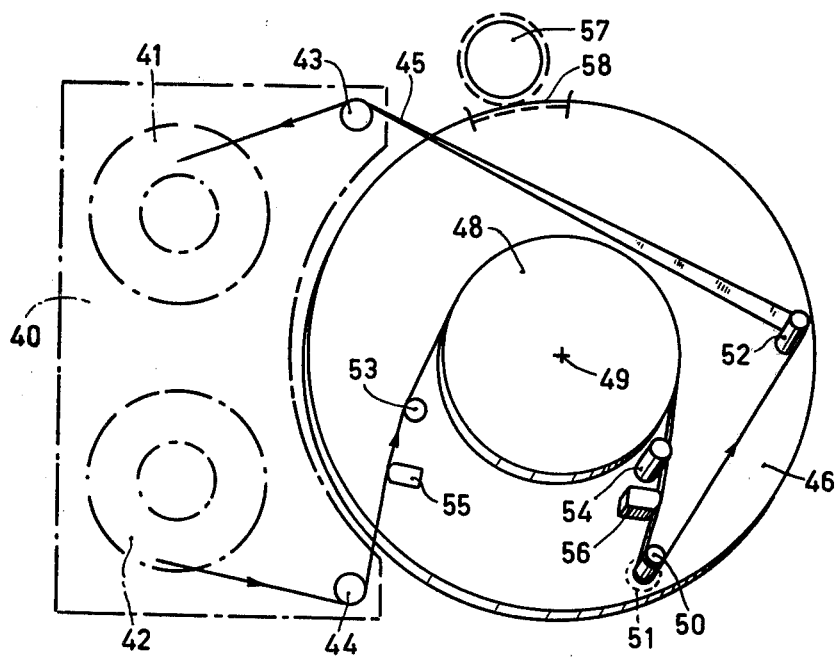

FIGS. 3 and 4 show an embodiment of the apparatus in accordance with the invention. A cassette 40, schematically represented by broken lines, has two adjacent co-planar tape reels 41, 42 and tape guide rollers 43, 44, between which a magnetic tape 45 wound on the reels is tensioned in the rest position shown in FIG. 3. The apparatus includes a support 46 on which a tape guide drum 48 is mounted, the support being pivotal and the drum rotatable about the same inclined axis 49. In accordance with the invention a tape guide element having the guiding function of the pin 14 shown in FIGS. 1 and 2 is constituted by a capstan or drive spindle 50 driven by a motor 41, shown schematically. Thus, the capstan and its drive motor are mounted on the pivotable support, together with a guide pin 52 which serves to hold the returning run of tape away from the drum, in the 180° wrap embodiment shown.

In the rest position (FIG. 3) the capstan 50 and guide pin 52 are positioned in the opening of the cassette behind the tape 45 where it extends across the opening. The capstan 50 and pin 52 are so inclined with respect to the support 46 that, in the rest position, they are generally perpendicular to the plane of the reels 41 and 42. In the present example the support also accommodates additional tape guides 53, 54 and additional magnetic heads 55, 56. The head 55 may for example be an erase head, and the head 56 may for example be an audio-recording/playback head. Preferably the axes of the head 56 and guide pin 54 are also parallel to the capstan 50 and pin 52.

When the support 46 is pivoted in accordance with the arrow 59 from its rest position of FIG. 3 to the operating position of FIG. 4, the tape is pulled out of the cassette by the capstan 50 and wrapped helically around the drum 48 over 180°. Because of the arrangement of the capstan 50, head 56 and pin 52, the tape is also wrapped approximately 180° around the capstan. The course of the tape in the operating position is clearly shown in FIG. 4. Between the capstan 50 and drum 48 the tape 45 is guided by the additional pin 54, and then contacts and passes over the head 56 on its path to the capstan. Because of the great friction between the capstan and tape caused by the usual tape tension, in accordance with the invention it is also possible to dispense with the usual pressure roller (10 in FIGS. 1 and 2) without the tape slipping during normal operation such as recording or playback.

The support 46 can be driven in various well-known ways, for example by a pinion 57 engaging a gear ring 58 on the circumference of the support 46 (shown partially for clarity), and driven by a motor (not shown).

It will be clear to those of ordinary skill in the art that many other constructional variations are possible within the spirit of the invention. For example, the support 46 need not be pivoted co-axially with the drum 48, but could be pivoted about a different axis. The additional heads and guide pins may be located in different positions relative to the drum and capstan.

I claim:

1. A self-threading helical scan cassette recorder comprising a tape guide drum along which tape from a cassette inserted into the recorder is passed in a helical path, and a tape guide device including a support pivotable about an axis and having at least one tape guide element disposed on said support; said support being pivotable between a rest position in which said at least one element is disposed behind tape extending across an opening in the cassette, said element projecting into the opening, and an operating position in which tape is extracted from the cassette and positioned around the drum; wherein said at least one guide element comprises a motor-driven capstan disposed on the support.

2. A recorder as claimed in claim 1, in which said at least one guide element comprises said capstan and a tape guide pin, in the rest position the capstan and guide pin being both positioned behind the tape, and in the operating position the tape being wrapped approximately 180° around the capstan such that friction between the capstan and tape due to tension in the tape is sufficient to prevent tape slipping on the capstan during normal operation.

3. A self-threading helical scan cassette recorder comprising a tape guide drum along which tape from a cassette inserted into the apparatus is wrapped in a helical path, and a tape guide device including a support pivotable about an axis and having at least one tape guide element disposed on said support; said support being pivotable between a rest position in which said at least one element is disposed behind tape which extends across an opening in the cassette, said element projecting into the opening in the cassette, and an operating position in which tape is extracted from the cassette and wrapped around the drum; wherein said at least one guide element comprises a motor-driven capstan disposed on the support and so arranged that upon rotation of the support from the rest to the operating position the capstan contacts the tape extending across the opening and wraps the tape about the drum.

4. A recorder as claimed in claims 1 or 3, having magnetic heads rotatable in a gap in the drum, comprising at least one additional magnetic head mounted on the rotatable support.

5. A recorder as claimed in claim 4 comprising an additional guide pin fixedly mounted on the rotatable support, said additional head and said additional pin being so arranged that in the operating position tape wrapped around the capstan also contacts and passes over the additional head, said additional head contacting said tape between the capstan and the additional head.

6. A recorder as claimed in claim 5 wherein said additional head and said additional pin contact said tape along a run of tape extending between the capstan and the drum.

* * * * *